United States Patent [19]

Nordby et al.

[11] Patent Number: 5,241,257
[45] Date of Patent: Aug. 31, 1993

[54] DRIVE SYSTEM FOR HOUSEHOLD APPLIANCES

[75] Inventors: Craig J. Nordby; Pradeep K. Sood, both of St. Louis, Mo.; Marco Venturini, Genova, Italy; Ciaran O'Breartuin, St. Louis, Mo.

[73] Assignee: Emerson Electric Co., St. Louis, Mo.

[21] Appl. No.: 908,758

[22] Filed: Jul. 1, 1992

Related U.S. Application Data

[63] Continuation of Ser. No. 339,502, Apr. 17, 1989.

[51] Int. Cl.5 ............................................... H02P 5/40
[52] U.S. Cl. ................................. 318/811; 68/12.01; 318/807
[58] Field of Search ............... 318/811, 803, 805, 807, 318/802, 798, 599; 68/12 R, 207; 363/41, 97, 132

[56] References Cited

U.S. PATENT DOCUMENTS

| | | | |
|---|---|---|---|
| 4,419,615 | 12/1983 | Muto et al. | 318/811 |
| 4,575,668 | 3/1986 | Baker | 318/811 |
| 4,602,201 | 7/1986 | Edwards | 318/811 |
| 4,615,000 | 9/1986 | Fujii et al. | 318/811 |
| 4,802,077 | 1/1989 | Fujii et al. | 318/811 |
| 4,838,050 | 6/1989 | Azuma | 68/12 R |

Primary Examiner—William M. Shoop, Jr.
Assistant Examiner—John W. Cabeca
Attorney, Agent, or Firm—Polster, Lieder, Woodruff & Lucchesi

[57] ABSTRACT

A drive system for a household appliance incorporates an electric motor. A control panel allows the user of the appliance to select from among various performance options which the appliance is able to perform. A microprocessor, functioning as a first control unit, is responsive to the selections and to various appliance sensors monitoring operational status of the appliance to control the operation of various components within the appliance by which the selected options are performed. An AC-DC converter and inverter supply electrical power to the motor. A second control unit, operating at a relatively faster rate of speed than the microprocessor, controls the supplying of power to the electric motor to achieve proper operation thereof.

12 Claims, 4 Drawing Sheets

DRIVE SYSTEM FOR HOUSEHOLD APPLIANCES

This is a continuation application of copending application Ser. No. 339,502, filed on Apr. 17, 1989.

BACKGROUND OF THE INVENTION

This invention relates to drive systems for use with electric motors and, in particular, to a drive system for use with variable speed electric motors utilized in household appliances.

Electric motors are commonly used in various household appliances including, for example, washing machines. Many large appliances such as washing machines are characterized by having both a main motor drive and various system and interface control functions. In a washing machine, for example, the system control functions include timing the washing action, setting the speed of the main drive, controlling the water level, and controlling the detergent inlet. These functions all depend, for each wash cycle, on the selections made by the user on the appliance control panel.

The motor drive for washing machines must function efficiently and effectively over a wide speed range with very low noise. Long life, the ability to repeatedly start and stop, and the ability to reverse motion direction often are also requirements of washing machine motor drives. Over the years, attempts have been made to simplify the drive systems employed to drive the agitator and spin basket of these machines. Many motor types, including both induction motors and direct current motors of various constructions, have been used for this purpose. Recently, brushless permanent magnet motors and electronically controlled motors having unusual winding configurations have been suggested for use in such appliances. As a rule, motors of this type are expensive to manufacture and difficult to control. Typically, they require expensive and sophisticated electronic control circuitry.

Problems arise in trying to incorporate sophisticated motors into these types of appliances. Most operations, such as opening and closing valves, controlling pumps, etc. do not require high speed control circuitry. On the other hand, motor control must occur, at least in part, at a much faster rate. Consequently, the electronic system associated with the motor drive must accommodate both slow and high rates of operational control. While circuits capable of performing both slow and high speed control functions can be designed, their cost, together with the cost of the sophisticated electric motors, rapidly drives the cost of the appliance out of the range which most buyers are willing to pay.

A desirable speed control technique would use a variable frequency inverter in combination with an induction motor. Such a drive system would provide the benefits of a motor which has been well tested, is extremely reliable, and is low in cost. Further, an induction motor is capable of the performance required by virtually any domestic appliance. While this solution is attractive, there is a penalty since the electrical control for induction motors is very complex. Complexity in general translates into a higher cost of design. The functions performed by inverter drives are varied, including speed control of the motor, motor flux and slip calculations, calculation of acceleration and deceleration ramps and protectional limits during reversal of the motor, synthesis of appropriate values of voltage and frequency for motor drive control, control of the output frequency of the inverter, and control of the output voltage or current of the inverter.

Although many of these inverter control functions may be performed at a relatively slow rate, control of the output voltage and/or current from the inverter to the motor may not. That function must be accomplished at a very high rate. In a system utilizing a microprocessor, the inverter control function of controlling output voltage and/or current usually requires a disproportionate amount of microprocessor capacity. Particularly in the case of a low cost microcontroller, drive control at these high frequencies leaves almost no space capacity for the other inverter control functions, or for the system and interface control functions mentioned above.

SUMMARY OF THE INVENTION

Among the several objects of the present invention may be noted the provision of a control system for use in household appliances such as a washing machine, which utilizes a low-cost microcontroller for system control function and most motor control functions.

Another object is the provision of such a system which employs a conventional alternating current (AC) induction motor.

A third object is the provision of such a system in which control functions of the appliance are segregated from the control functions relating to the voltage and/or current applied to the motor.

A fourth object is the provision of such a system with low input harmonic current drawn from the ac source.

A fifth object is the provision of such a system which is efficient yet low in cost.

A sixth object is the provision of such a system which controls both slow and fast functions reliably and at low cost.

A seventh object is the provision of such a system which is relatively quiet.

Other objects and features will be in part apparent and in part pointed out hereinafter.

Briefly, a drive system of the present invention is designed for use in household appliances incorporating an electric motor. A user of the appliance uses a selection panel to selects from among various performance functions of the appliance those functions which the appliance is to perform. The appliance operates at least the electric motor in accordance with the selected functions. The drive system includes a first control circuit which is responsive to the selection panel and to the operational status of the appliance for controlling the operation of various components within the appliance by means of which the selected functions are performed. The first control circuit controls some but not all of the functions of the electric motor. Power circuitry supplies electrical power to the electric motor, and a second control circuit interconnected with the first control circuit controls the voltage or current supplied by the power circuitry to the electric motor.

The method of the present invention includes the step of manually selecting from among a number of possible functions those functions which an appliance such as a washing machine is to perform. A first control circuit senses those options manually selected by the user. Electrical power is selectively supplied to the electric motor, the magnitudes of the voltage or current supplied to the motor being controlled by a second control circuit interconnected to the first control circuit. The first control circuit senses the operational status of the appliance and provides control signals to the second control circuit to change the voltage or current supplied to the electric motor. The first control circuit controls electric motor functions other than the voltage or current supplied to the motor.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
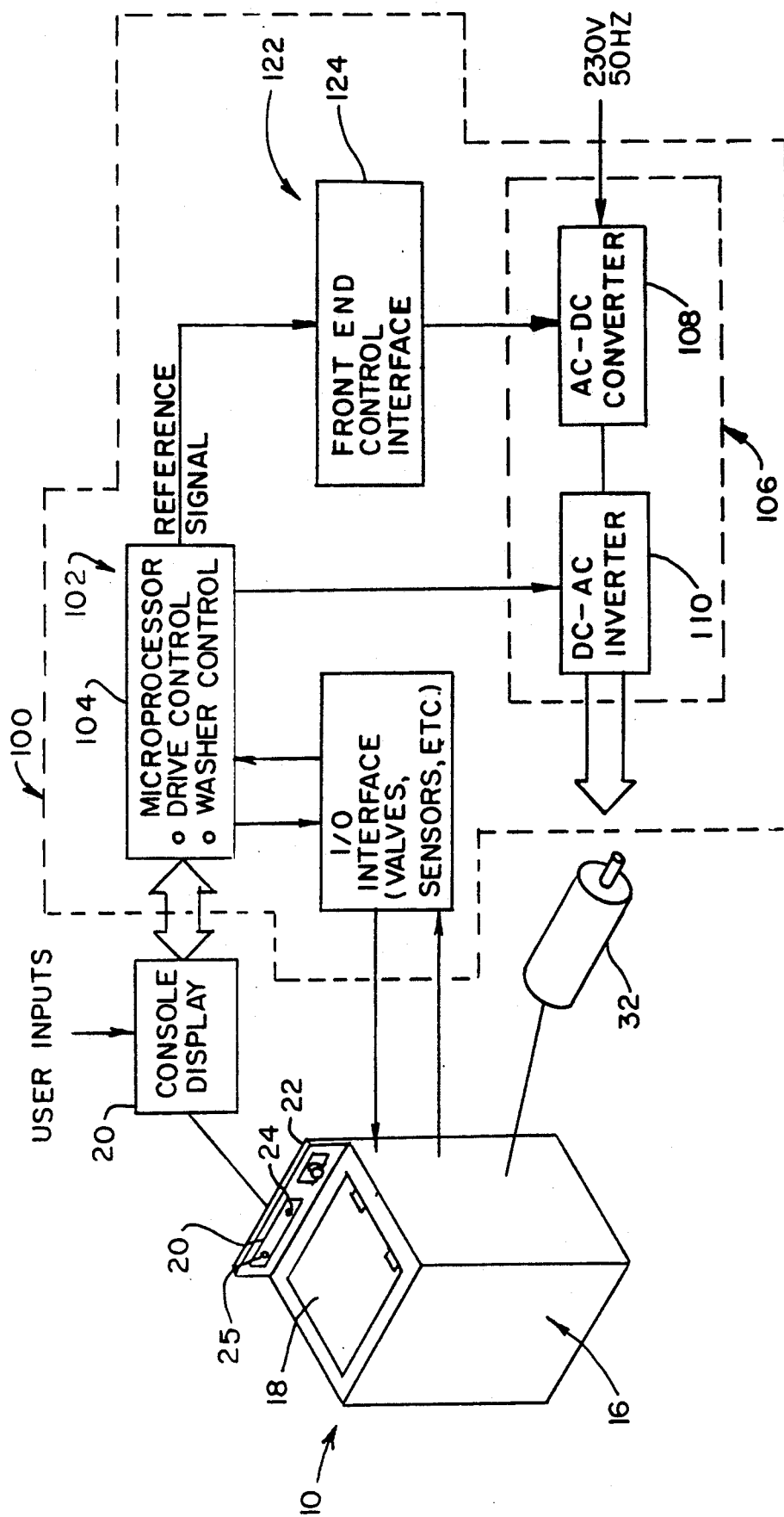
FIG. 1 is a diagrammatic view depicting an automatic washing machine utilizing a drive system of the present invention.
Figure 2:
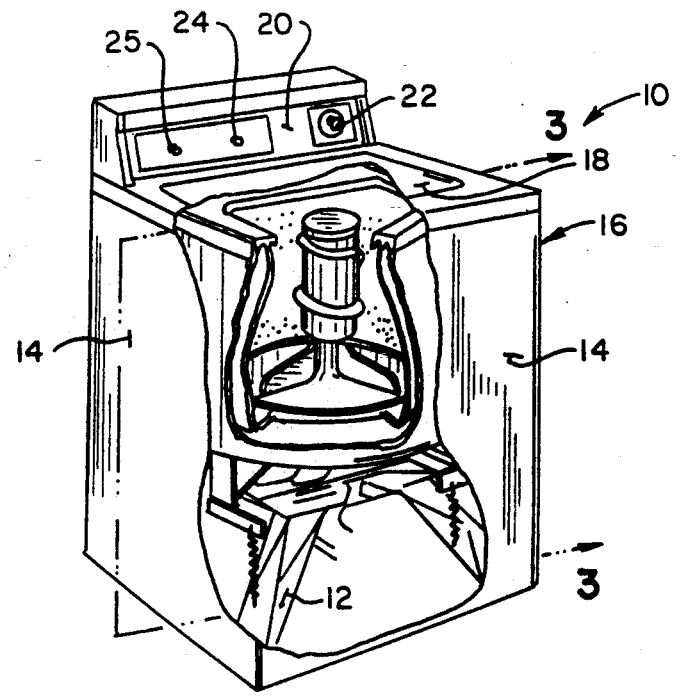
FIG. 2 is a perspective view, partially broken away, of an automatic washing machine in which the drive system of the present invention is utilized.
Figure 3:
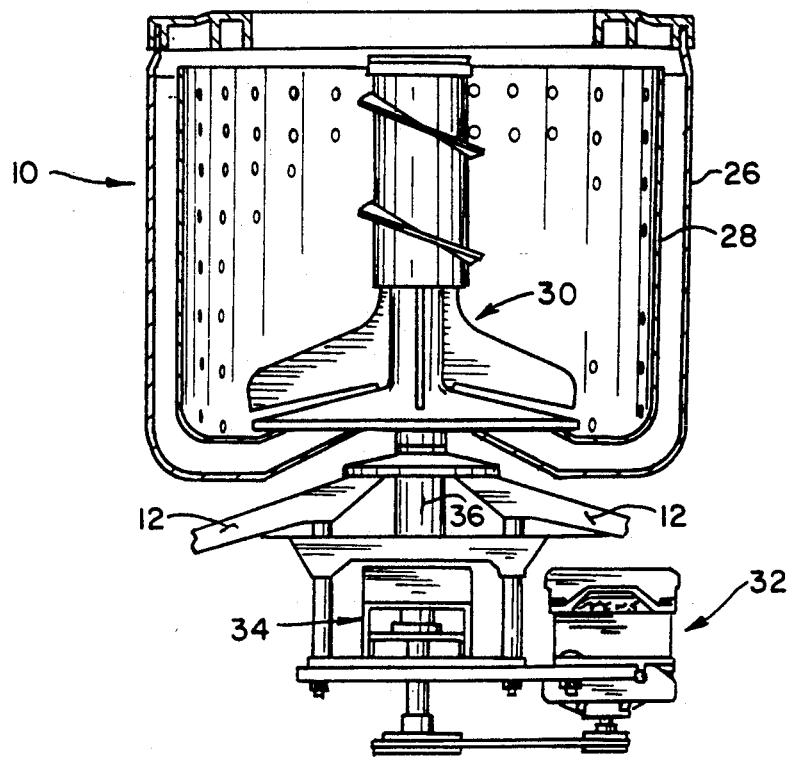
FIG. 3 is a sectional view, with parts removed for clarity, of the washing machine of FIG. 2 taken along lines 3—3.

The present invention is embodied in a top load washing machine 10 (FIGS. 1-3) although the invention is not limited to any particular type of washing machine or any particular washing machine construction. As shown in FIGS. 2 and 3, washing machine 10 is a vertical axis agitator type washing machine. A frame 12 of the machine carries a plurality of panels 14 forming the sides, top, front and back of a cabinet 16. A hinged lid 18 is provided in the usual manner on the top of the machine for access to the interior of the machine.

A control panel or control console 20 is located at the top rear portion of washing machine 10. Arranged on console 20 are various user selectable controls including a timer 22 and temperature selector 24. Other controls, such as a control switch 25 may be provided. It will be understood that console 20 provides user access to a plurality of appliance performance functions or options among which the user of the appliance may choose. The controls may be implemented by means of push-button switches, touch pads or other suitable user operable switches.

Referring to FIGS. 2 and 3, a fluid containing tub 26 is disposed within washing machine 10. A perforated basket 28 is mounted within tub 26 for rotation about a vertical axis. An agitator 30 is connected for operation to a motor 32 through a drive mechanism 34. Agitator 30 is linked by a shaft 36 to drive mechanism 34. Although drive mechanism 34 is shown as including a pulley in FIG. 3, it should be realized that the present invention is not limited to any particular drive mechanism. That is, those skilled in the art will recognize that a variety of other drive arrangements can be utilized with motor 32. Motor 32 may even be directly attached to either the agitator or spin basket of the washing machine so that a drive system 100 of the present invention can be used to directly control operation of the washing machine. As will be appreciated by those skilled in the art, the washing machine described herein is by way of illustration only. In practice machine 10 may comprise any of a variety of commercially available appliances.

Motor 32 is preferably any of a variety of commercially available induction motors. For example, motor 32 may be a three-phase AC induction motor designed for 0-500 hertz operation with a power rating of 500 watts.

Drive system 100 of the present invention controls the functioning of washing machine 10, including the functioning of electric motor 32. A user of the appliance selects from among the various performance options of the appliance and the appliance is controlled by drive system 100 to operate in accordance with the selected options. The selection means by which the user selects from among the performance options comprises the control console 20. As noted, console 20 includes a plurality of switches, such as switches 24 and 25, by which the user selects those performance options which the user wants the appliance to perform.

Figure 4:
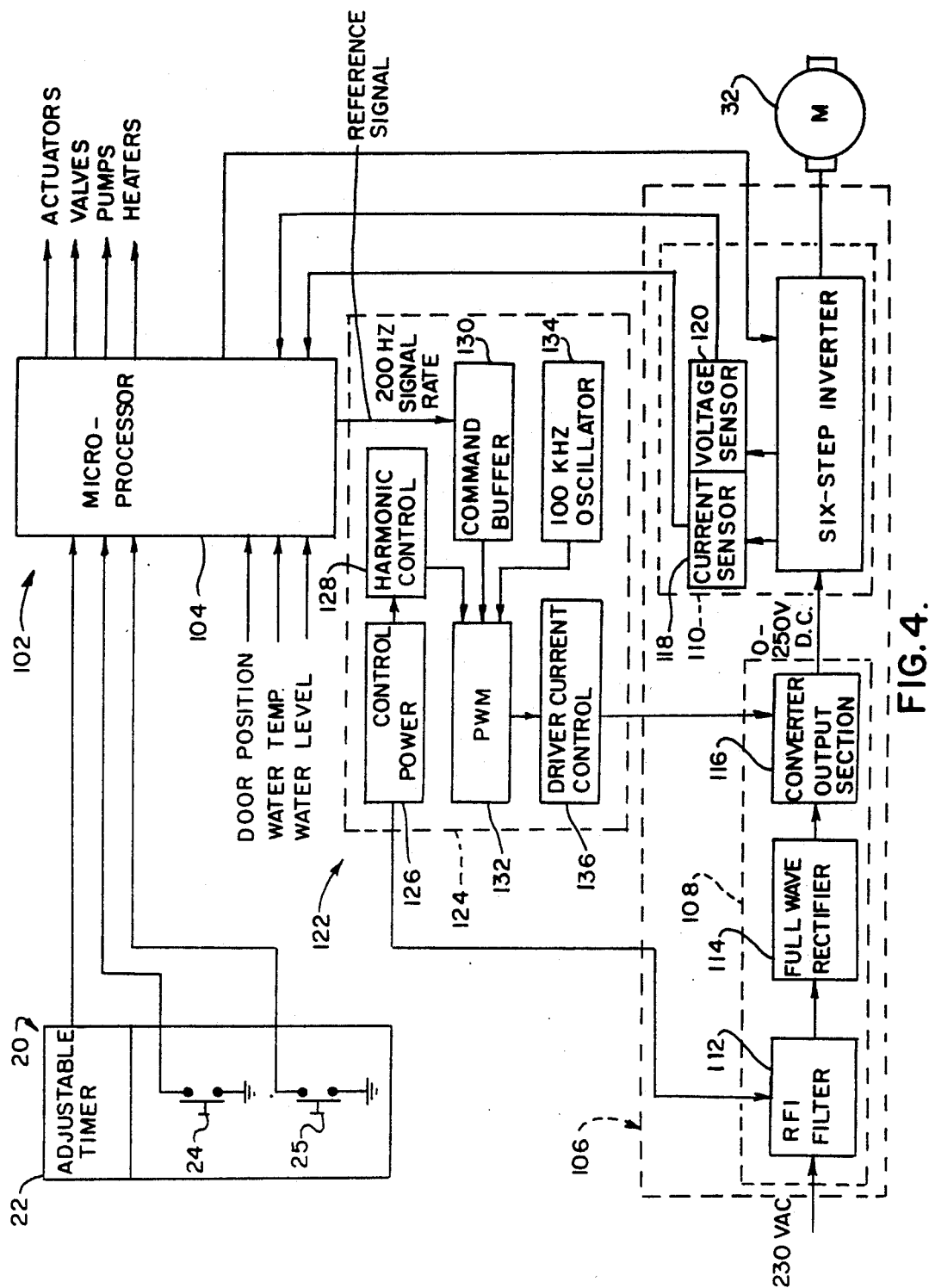
FIG. 4 is a block diagram of the drive system of the present invention.

The drive system includes a first control means 102 which in the present embodiment is a microprocessor 104. The microprocessor is responsive to the switch settings or options selected by the user. As shown in FIG. 4, microprocessor 104 is provided output signals from washing machine timer 22 together with electrical signals indicative of the selection of the options represented by switches 24 and 25. Further, the microprocessor monitors the operational status of the appliance through the inputs from various conventional sensors (not shown) such as a door position sensor, a sensor indicating the water level in tub 28, and a sensor indicating the water temperature in the tub. In response to these various user and sensor inputs, microprocessor 104 controls operation of various washer components such as actuators, valves, pumps and heaters to control operation of the washer. It is through this control function that the microprocessor insures that the selected options are performed.

Figure 4A:
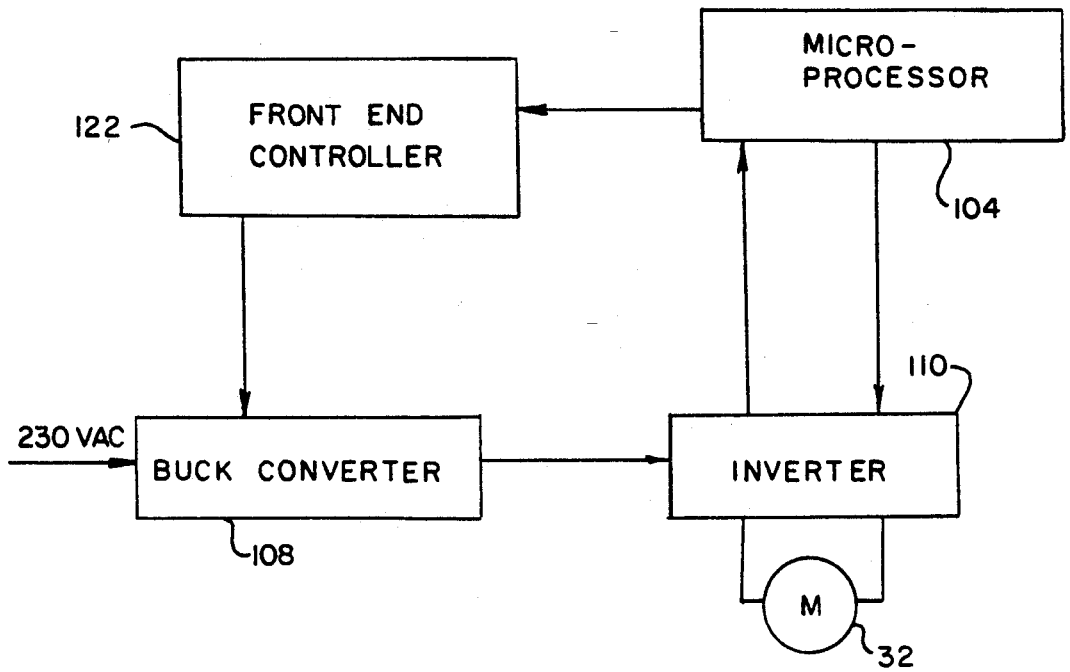
FIG. 4A is a block diagram similar to a portion of FIG. 4 in which the converter is a buck converter.
Figure 4B:
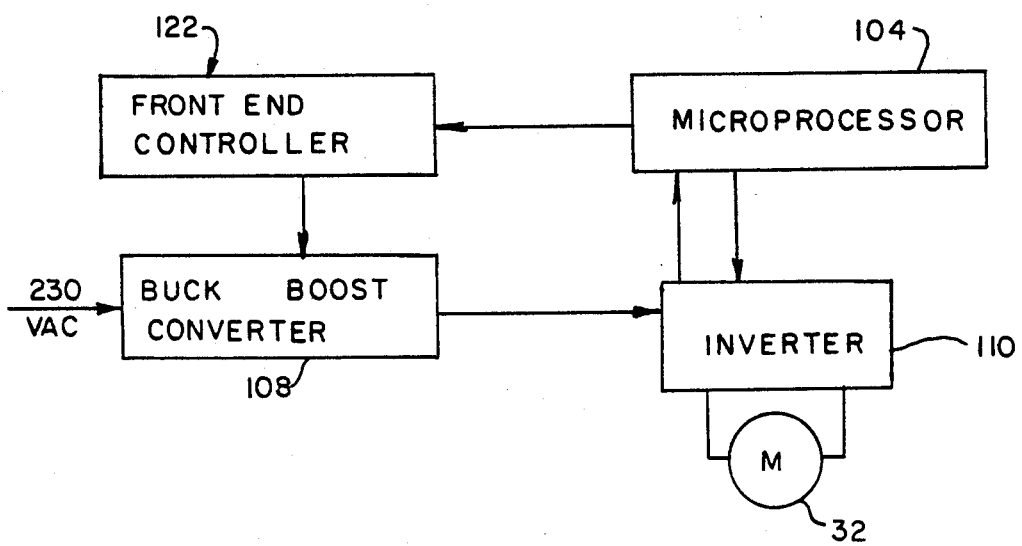
FIG. 4B is a block diagram similar to FIG. 4A in which the converter is a buck boost converter.

Power for induction motor 32 is supplied via a power means 106. As indicated in FIGS. 1 and 4, means 106 includes an AC-DC converter 108 connected to the 230 V power main and a DC-AC inverter 110. Both the converter and the inverter are of conventional construction. Converter 108 is preferably a buck boost converter (as shown in FIG. 4B), although a buck converter (as shown in FIG. 4A) can be used as well. The converter includes a radio frequency interference (RFI) filter input section 112, a full wave rectifier section 114 and an output section 116. Since these elements are conventional, the electrical design of these various sections of the converter are not described in detail. It will be understood that the AC-DC converter converts 230 volt, single-phase, 50 hertz input into a controlled DC output having a voltage range of 0 to 250 volts, which DC output is supplied to the inverter.

Inverter 110 is a 6-step inverter whose construction is well known in the art. The inverter includes a current sensor 118 and a voltage sensor 120 which supply voltage and current information to the microprocessor. In return, microprocessor 104 supplies a reference signal to the front end control interface 124, which is then transmitted to AC-DC converter 108.

During a washing machine cycle, motor 32 is operated at various speeds. In addition, the motor is required to start and stop numerous time, the rate of motor acceleration and deceleration varying. The drive for motor 32 is provided by the output of inverter 110. Control of the inverter must include a consideration of such factors as: speed control, calculation of motor flux and slip, computation of acceleration and deceleration ramps, synthesis of appropriate values of the voltage and frequency for the motor, control of the inverter output frequency, and control of the voltage and/or current levels applied to the motor. Of these various functions, only the control of the voltage or current supplied to the motor needs to be accomplished at very high (usually ultrasonic) frequencies. This is necessary to reduce noise, size and lost associated with this function. All of the calculations associated with the above, together with the other appliance control functions, are accomplished using microprocessor 104. However, because of the frequency at which the output voltage and/or current calculations are made, this function requires a disproportionate amount of microprocessor capacity.

Accordingly, drive system 100 includes a second control means 122 interconnected with microprocessor 104. Means 122 includes a front end controller 124 which controls operation of power means 106 and thereby operation of motor 32. The front end controller, which is designed for implementation on a dedicated integrated circuit chip or the like, operates at a relatively faster rate of speed than microprocessor 104. The function of the front end controller is to control the voltage and/or current supplied to motor 32 and thereby relieve microprocessor 104 of that function.

As shown in FIG. 4, the front end controller includes a control power unit 126 which provides power to the control circuitry of converter 108. A command buffer 130 of the controller receives input signals from microprocessor 104, these input signals being supplied at a rate of, for example, 200 hertz. A pulse width modulator (PWM) 132 is supplied a base frequency by a 100 kilohertz oscillator 134. The PWM is responsive to a current control signal from command buffer 130 and a current shaping signal from harmonic control circuit 128 to generate a variable frequency output signal which is supplied to a drive control circuit 136. Typically, the frequency of the signal generated by PWM 13 is much greater than the frequency of operation of microprocessor 104.

Driver current control circuit 136 is responsive to the frequency signal from PWM 132 to control operation of converter output section 116 of converter 108. This is readily done using standard components by using a pulse width modulation chip for PWM 132 and using its square wave output to control a transistor in one side of the AC-DC converter. The output of the pulse width modulation chip thus directly controls the output voltage of AC-DC converter 108. This controlled voltage, in turn, is supplied to the input of inverter 110. The variation in the signal supplied to inverter 110 by converter 108 insures that motor 32 accelerates, decelerates or reverses at the appropriate rate to perform the proper function at any given time during the washing machine cycle.

In view of the above, it will be seen that the several objects and features of this invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A drive system for use in a household appliance incorporating an electric motor, the appliance having selectors by which a user of the appliance selects from among various performance functions of the appliance, the appliance operating at least the electric motor in accordance with the selected function, the drive system comprising:

power means supplying electrical power to the motor, said power means including AC-DC conversion means connected to a source of electrical energy and DC-AC inversion means connected to said motor, an output of said AC-DC conversion means being supplied as an input to said DC-AC inversion means;

first control means responsive to the selectors and the operational status of the household appliance for controlling operation of the various components within the household appliance by which the selected functions are performed, said first control means including microprocessor means for supplying a first control signal to said DC-AC inversion means; and, second control means interconnected with said first control means and including front end control means to which a second and separate signal is supplied by said microprocessor means, said front end control means including pulse width modulation means to which said second signal is supplied, said pulse width modulation means being responsive to said second signal to produce an output signal which is supplied as an input to said DC-AC conversion means, whereby said power means controls at least one of the voltage or current supplied by said power means to said motor.

2. The drive system of claim 1 wherein said motor is an AC induction motor.

3. The drive system of claim 2 wherein DC-AC inversion means is a six step inverter.

4. The drive system of claim 2 wherein said AC-DC conversion means is a buck converter.

5. The drive system of claim 2 wherein said AC-DC conversion means is a buck boost converter.

6. The drive system of claim 2 further including as the function selectors a control console on the household appliance accessible to the user.

7. The drive system of claim 6 wherein said control console includes a plurality of switches operable by the user to select those performance functions which the household appliance is to perform.

8. The drive system of claim 7 wherein said microprocessor means has as one set of inputs the user operated switch settings.

9. The drive system of claim 8 wherein said front end controller means further includes buffer means responsive to an input from said microprocessor means to control operation of said pulse width modulator.

10. The drive system of claim 9 wherein said front end controller means further includes harmonic control means interconnected with said pulse width modulator to prevent harmonic distortion in the ac current drawn from said electrical energy source.

11. The drive system of claim 10 wherein said front end controller means further includes driver current control means responsive to an output of said pulse width modulator to provide a current control signal to said AC-DC conversion means.

12. The drive system of claim 1 wherein said DC-AC inversion means includes respective current and voltage sensing means providing input signals to said microprocessor means, said microprocessor means in response thereto, supplying a control signal to said inversion means.

* * * * *